May 31, 1932.    P. H. GEIGER ET AL    1,861,083

ELECTRICAL RECTIFIER

Filed Jan. 29, 1929

Inventors:
P. H. Geiger, and
C. K. Stroebel,
by A. L. Vencill
Their Attorney

Patented May 31, 1932

1,861,083

UNITED STATES PATENT OFFICE

PAUL H. GEIGER, OF WILKINSBURG, AND CHARLES KENNEDY STROBEL, OF PITTSBURGH, PENNSYLVANIA, ASSIGNORS TO THE UNION SWITCH & SIGNAL COMPANY, OF SWISSVALE, PENNSYLVANIA, A CORPORATION OF PENNSYLVANIA

ELECTRICAL RECTIFIER

Application filed January 29, 1929. Serial No. 335,990.

Our invention relates to electrical rectifiers, and particularly to rectifiers of the type disclosed and claimed in United States Letters Patent No. 1,640,335, granted to L. O. Grondahl on the 23rd day of August, 1927. One feature of our invention is the provision of a rectifier of this character which is suitable for use in connection with small currents.

A copper oxide rectifier designed for small currents must possess a high resistance, as well as a good rectifying ratio, in order to operate efficiently. This is evident from the fact that the rectifying ratio of a copper oxide rectifier increases with an increase of voltage, and so to obtain high efficiency it is necessary to operate the rectifier at a voltage which will give a good rectifying ratio. If the resistance of the rectifier is low, more power is required to operate on the desired portion of the resistance voltage curve than if the resistance of the rectifier is high.

We have attempted to make rectifiers having a high resistance, as well as a high rectifying ratio, and on first thought it would appear that this result can be accomplished by merely reducing the size of the copper oxide disk. We have not been able to make small disks having a resistance in the high resistance direction inversely proportional to the area of the disk, as one would naturally assume could be easily done. As a matter of fact, it appears that relatively small disks have about the same resistance as the standard 1½" disks now commonly used for battery charging rectifiers. We have also tried to reduce the area of the cuprous oxide surface by mechanical means, but even with this expedient we have been unable to increase the high resistance of the rectifier.

By means of our present invention we have been able to make rectifiers having a high resistance many times as great as by the obvious methods just referred to, and which have rectifying ratios of several thousand or more.

The present case is a continuation in part of our co-pending application, Serial No. 270,668, filed April 17, 1928, for Electrical rectifiers, in so far as the matter common to the two cases is concerned.

We will describe several methods embodying our invention, and will then point out the novel features thereof in claims.

Figure 1:
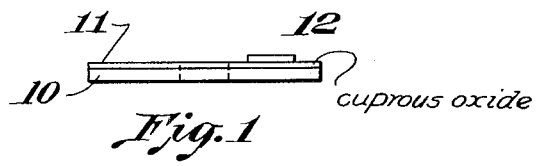
Figure 3:
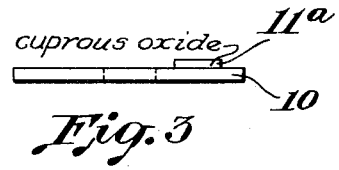
Figure 2:
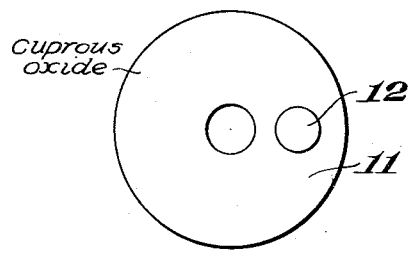
Figure 4:
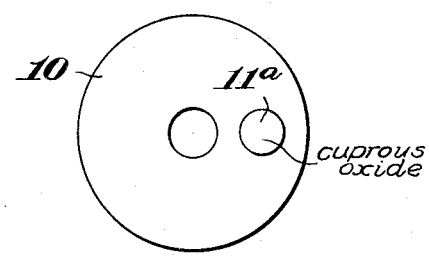
Figure 5:
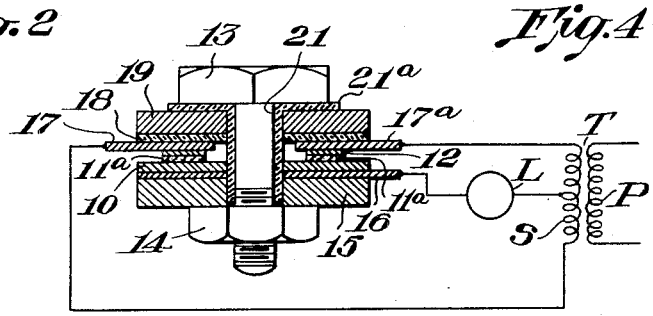

In the accompanying drawings, Fig. 1 is a side view showing a rectifier in one stage of the process of manufacture embodying our invention. Fig. 2 is the top view of the rectifier shown in Fig. 1. Fig. 3 is a side view, and Fig. 4 a top view, of a finished rectifier produced in accordance with our invention. Fig. 5 is a view, partly diagrammatic, showing another form of rectifier embodying our invention, as well as one means for connecting this rectifier in an electrical circuit. Figs. 6 and 7 are top and side views, respectively, illustrating another process embodying our invention for the production of rectifiers. Figs. 8 and 9 are sectional and end views respectively, of a device used in another process embodying our invention for the production of rectifiers.

Similar reference characters refer to similar parts in each of the several views.

Referring first to Figs. 1 and 2, the reference character 10 designates a copper disk having cuprous oxide 11 formed on one surface thereof, this combination constituting a rectifier unit which may be made in accordance with Grondahl Patent No. 1,640,335, referred to above. A small spot on the cuprous oxide coating 11 is covered with paraffin 12, the area of this spot being determined by the electrical characteristics which it is desired that the rectifier shall have. The disk is then placed in a reagent which will dissolve the cuprous oxide but not the copper or the paraffin; one such reagent is nitric acid, and another one is a solution of sodium cyanide. After being treated with this reagent the paraffin is removed, so that the rectifier then consists of a copper disk 10 having a small spot 11$^a$ of cuprous oxide formed on a relatively small area of the disk. The rectifier in its finished form is illustrated in Figs. 3 and 4.

The substance 12 need not necessarily be paraffin, but may be any soft material which does not dissolve in the reagent used to dissolve the cuprous oxide.

The protective coating of paraffin may be produced by dropping molten paraffin directly upon the cuprous oxide surface, but in order to control the size and shape of the paraffin spot, we have found that it is more satisfactory to punch a piece of paper of the size which it is desired that the spot shall have, dip it in molten paraffin, and then apply it to the oxide surface with a warm rod.

When either of the above methods of applying paraffin is used, there may be difficulty in removing all of the paraffin from the surface of the oxide spot after treating the disk in the reagent which dissolves the cuprous oxide. To avoid this difficulty, we have found that it is convenient to punch out two pieces of paper, one of which is slightly larger than the other, the larger piece having the diameter which it is desired that the spot of cuprous oxide shall take. The larger piece of paper is heavily paraffined, and the smaller piece of paper is placed on the center of the larger piece. The two pieces of paper are then placed on the oxide surface, the paraffined piece being next to the oxide, and the overlapping edge of the larger piece is fastened down to the oxide surface by pressing with a heated metal tube, the inside diameter of which is slightly greater than the diameter of the smaller piece of paper, but less than the diameter of the larger piece of paper. The rectifier disk thus prepared can then be treated for the removal of the undesired cuprous oxide, after which it is a very simple matter to remove the two pieces of paper.

Referring now to Fig. 5, the rectifier unit in the form here shown, comprises a disk 10 having a central aperture and provided with two spots 11ª of cuprous oxide, each of which may be produced by any of the methods hereinbefore described, or by any other suitable method. This disk is mounted on a bolt 13 between two heavy metallic washers 15 and 19. Interposed between washer 15 and the disk 10 is a terminal washer 16. Each cuprous oxide spot 11ª is provided with a soft lead washer 12, and individual terminals 17 and 17ª are located in contact with these two lead washers respectively. The terminals 17 and 17ª are electrically isolated from the heavy washer 19 by an insulating washer 18. An insulating tube 21 having a flange 21ª at its upper end, protects all of the metallic parts from electrical contact with the bolt 13. The parts carried by the bolt are all clamped together by means of a nut 14. The reference character T designates a transformer, the primary P of which is connected with a source of alternating current not shown in the drawings. One terminal of the secondary S of this transformer is connected with the terminal 17, and the other terminal of the secondary S is connected with the terminal 17ª. A load L has one terminal connected with washer 16 and the other terminal connected with the middle point of the secondary S. It will be seen that by virtue of this apparatus the load L is supplied with unidirectional current, and that the apparatus constitutes a full wave rectifier.

Referring now to Figs. 6 and 7, we have illustrated another method of producing rectifiers having the desired characteristics. This method consists in taking a standard disk 10 of copper and producing slots 20 across one surface by suitable means such as a hack saw. These slots extend almost through the disk, and are disposed at right angles, so that they divide the disk into a plurality of relatively small areas. The disk is then treated in the usual manner to form a coating of cuprous oxide on the surface which is provided with the slots 20. The oxide around the edges of each area is broken due to the sharp edges of the slots 20, so that each area has an isolated spot of cuprous oxide. The disk can be assembled with proper insulation so as to use only the desired number of small areas, or the disk can be broken up into individual pieces each corresponding in size to an area bounded by the slots 20. Instead of cutting the slots with a hack saw, they may be produced by a disk punch, and this means of producing the slots appears to give a better ratio of area to the circumference and to cause less leakage than when a hack saw is used to produce the slots.

Referring to Figs. 8 and 9, we have here illustrated a cylinder 22, which may be of rubber or other suitable material, and the end 24 of which has a concave surface 23. Instead of paraffin 12, illustrated in Figs. 1 and 2, concave end 24 of cylinder 22 is used to protect a small spot of the cuprous oxide coating 11 during submersion of the disk in a reagent for dissolving the oxide coating which is not included in the spot. During the submersion of the disk, end 24 of cylinder 22 is pressed tightly against the oxide coating. As the oxide around the spot becomes dissolved, the cylinder end 24 closes down around the spot, producing a cleaner cut edge of the spot than results with the methods previously described. The diameter of cylinder 22 is determined in accordance with the oxide spot diameter desired. Uniformity of size of the spots can readily be attained by the cylinder method of protection.

Rectifiers embodying our invention are suitable for use whenever small currents are involved, and are particularly well adapted for use as radio detectors.

Although we have herein shown and described only a few methods of producing rectifiers embodying our invention, it is understood that various changes and modifications may be made therein within the scope of the appended claims without departing from the spirit and scope of our invention.

Having thus described our invention, what we claim is:

1. The method of making a rectifier for small currents, which consists in forming cuprous oxide on a copper blank, and then removing said oxide from all except a relatively small area of said blank.

2. The method of making a rectifier for small currents, which consists in forming cuprous oxide on a copper blank and then chemically dissolving said oxide from all except a relatively small area of the metal.

3. The method of making a rectifier for small currents, which consists in forming cuprous oxide on a copper blank, covering a relatively small area of the oxide coating with paraffin, and treating the device with a reagent which will dissolve the exposed copper oxide but not the paraffin.

4. The method of making a rectifier for small currents, which consists in forming cuprous oxide on a copper blank, covering a relatively small area of the oxide coating with paraffin, and treating the device with a solution of nitric acid.

5. The method of making a rectifier for small currents, which consists in forming cuprous oxide on a copper blank, covering a relatively small area of the oxide coating with paraffin by dipping a piece of paper in molten paraffin and applying it to the oxide coating with a warm rod, and treating the device with a reagent which will dissolve the exposed copper oxide but not the paraffin.

6. In combination, a metal blank having a compound of the metal formed on two relatively small portions of the area of the blank, a source of alternating current the two terminals of which are connected with said two portions of compound respectively, and a load having its terminals connected with said metal blank and an intermediate point in said source respectively.

7. The method of making a rectifier for small currents, which consists in placing a piece of paper on the oxide surface of a copper oxide rectifier, superposing on said first piece of paper a larger piece of paper soaked with paraffin, attaching the overlapping edges of the second piece of paper to the oxide surface by heating with a tube the inside diameter of which is slightly greater than the diameter of the first piece of paper, and treating the device with a solution which dissolves the exposed copper oxide but does not dissolve paraffin.

8. The method of making a rectifier for small currents, which consists in chemically dissolving the oxide coating from all but a relatively small part of the surface of a copper oxide rectifier.

9. The method of making a rectifier for small currents, which consists in forming cuprous oxide on a copper blank, covering a relatively small area of the oxide coating, and treating the device with a reagent which will dissolve the uncovered oxide coating.

10. The method of making a rectifier for small currents, which consists in forming cuprous oxide on a copper blank, covering a relatively small area of the oxide coating with a concave end of a rubber cylinder, and treating the device with a reagent which will dissolve the uncovered oxide coating.

11. The method of making a rectifier for small currents, which consists in forming cuprous oxide on a copper blank, covering a relatively small area of the oxide coating with a concave end of a rubber cylinder which is pressed tightly against the oxide coating, and treating the device with a reagent which will dissolve the uncovered area of the oxide coating.

In testimony whereof we affix our signatures.

PAUL H. GEIGER.
CHARLES KENNEDY STROBEL.